March 4, 1924.                                                                                1,485,437
A. SONSTHAGEN
MACHINE FOR COATING CHOCOLATES
Filed Feb. 17, 1922
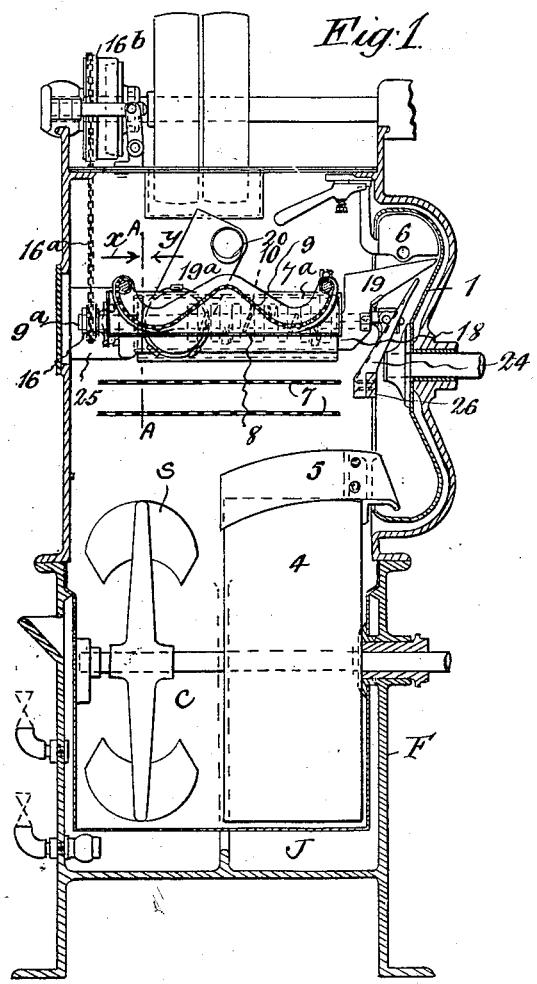
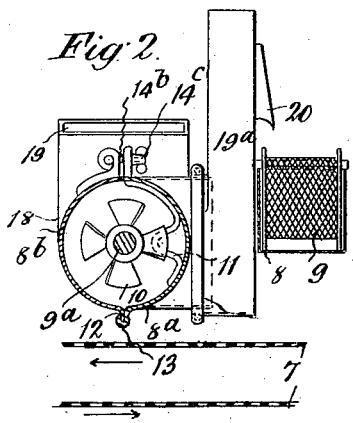
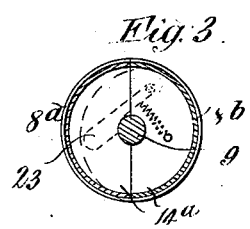
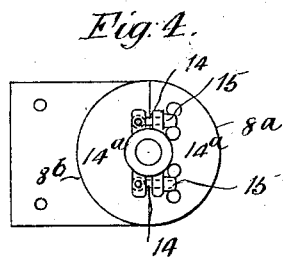
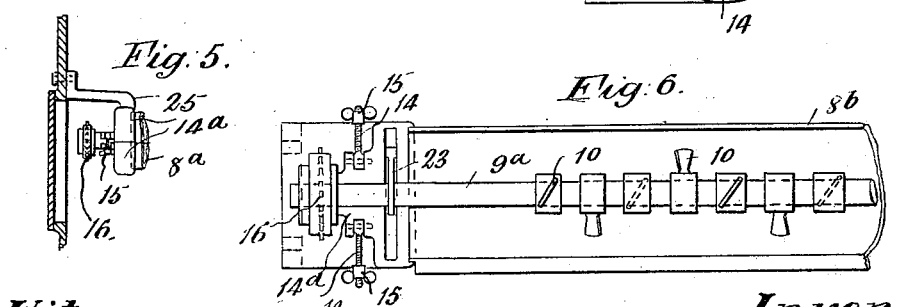
Witnesses:
Inventor:
Asbjorn Sonsthagen,
By his Atty, Patented Mar. 4, 1924.

1,485,437

UNITED STATES PATENT OFFICE.

ASBJORN SONSTHAGEN, OF LEYTONSTONE, ENGLAND.

MACHINE FOR COATING CHOCOLATES.

Application filed February 17, 1922. Serial No. 537,228.

*To all whom it may concern:*

Be it known that I, ASBJORN SONSTHAGEN, a subject of the King of Norway, residing in Leytonstone, Essex, England, have invented certain new and useful Improvements in and Relating to Machines for Coating Chocolates, of which the following is a specification.

This invention relates to machines for coating chocolates and refers to machines of the so-called "Enrober" type in which the cores to be coated are passed through stream of chocolate.

With machines of this type it is found that the chocolates are inclined to present a dull appearance as distinguished from the good hand dipped chocolates the glossy surface of which gives them a more attractive appearance.

The present invention has for its object certain improvements in chocolate coating machines of the type before referred to whereby the chocolates shall present the attractive appearance usually associated with those which have been hand dipped or coated.

According to this invention there is incorporated in the machine a device whereby the chocolate is subjected to a rapid mixing or emulsifying action such mixing or emulsifying treatment taking place just before the chocolate passes to the cores or after such an interval of time that little or no physical change in its condition is possible between said treatment and the coating operation.

According to this invention as applied to the so-called "Enrober" machine, the chocolate when elevated from the main container instead of passing to the trough by which it is supplied to the cores may first pass into a rapid mixer or emulsifer.

As applied to a machine in which the material is elevated by means of an annular body disposed at the side of the machine as herein shown and described and as shown and described in a substantially similar machine in the specification accompanying the Letters Patent granted to me under No. 1,391,914, the material when removed from said body would pass directly to the mixer or emulsifier and from there to the distributing trough.

Instead of this arrangement, however, the material may pass to the mixer or emulsifier prior to being supplied to the annular body by which it is delivered to the distributing trough. In any case it is desirable that as short a period of time as possible should elapse between the emulsifying or mixing of the material and its application to the cores.

In order that the invention may be the better understood drawings are appended in which:—

Fig. 1 is a vertical section of a machine embodying the present invention,

Fig. 2 is a transverse section on line A A Fig. 1 looking in the direction of the arrow $x$, Fig. 3 is a section on line A A looking in the direction of arrow $y$, Fig. 4 is an end view showing the means of connection for the component members of the case of the emulsifier, Fig. 5 is a plan view showing the method of supporting one end of the emulsifier, Fig. 6 is a view showing the case of the emulsifier open to show the interior.

In the accompanying drawing the invention is illustrated as applied to a coating machine comprising a main frame F having in the lower portion thereof the chocolate receptacle C surrounded by the water or steam jacket J, the receptacle C having therein the rotatable stirrer S and drum 4. The frame F at the upper portion of one side thereof is extended to form a portion of the side having outwardly curved ends connected by an inwardly curved mid portion whereby an interior chamber is formed, and has rotatably supported therein the circular trough-like member 1, substantially conforming in shape in cross-section to the cross-section of said chamber, the ends of this member during rotation of the member passing in operative adjacency to the scraper 5 on the drum 4 and to the scraper 6 operatively connected to the frame F and projecting into said member at the uppermost point of the interior of its periphery, the intention being that the chocolate removed from the drum 4 by the scraper 5 into the trough-like member 1 shall be removed from said member by the scraper 6. A frame 8, shown in Fig. 2, supports a trough 9 formed of wire netting or other material whereby the chocolate fed therein is permitted to fall in a stream upon the cores carried thereunder by the belt or conveyor 7.

7$^a$ indicates generally an emulsifier or mixer which may be of any suitable form but in the present instance comprises a case of circular cross-sectional outline formed in two parts $8^a$, $8^b$, and through which runs a shaft $9^a$ to which are secured blades 10 adapted to feed the chocolate with an oscillating or vibrating movement from one end of the case to the other. Fixed projections formed of thin sheet metal, as shown by the dotted lines 11 in Fig. 2, are provided inside the case being interspaced with the aforesaid blades 10, whereby the chocolate is agitated during said oscillatory or vibratory movement.

The parts of the case are detachably connected by means of the longitudinal lip or projection 12, clearly shown in Fig. 2 formed upon one part engaging a U-shaped projection 13 upon the other part. The parts are held together at one end by eye bolts 14 and fly nuts 15, Figs. 4 and 6, and at the other end by means of the bolt $14^b$ and the nut $14^c$, as more clearly shown in Fig. 2. The eye bolts 14 are carried by the body $14^a$ also formed in two parts which are recessed to engage the end of the case.

Motion is imparted to the shaft $9^a$ by means of the chain wheel 16 thereon to which motion is imparted by means of a chain $16^a$ running over a chain wheel $16^b$ secured to the main shaft 17.

Clamped between the parts of the case of the emulsifier at one end is an annular body 18 provided with a hopper or chute 19 in which the chocolate is received as it falls from the scraper 6 and from which hopper or chute the chocolate passes to the interior of the emulsifier or mixer $7^a$. Arranged upon the side of the casing of the emulsifier in a manner such that it is capable of angular movement in the vertical plane is a discharge spout $19^a$ having at the upper end a lip 20 whereby the chocolate is directed outwards away from the spout and falls into the distributing device 9 through which it falls in a stream upon the cores which are placed upon the belt or conveyor 7.

The passage of the chocolate through the emulsifier $7^a$ is due to the action of the blades 10 which gradually feed the chocolate towards the discharge end of the emulsifier, and into the discharge spout $19^a$ communicating with the discharge end, thereby filling the spout $19^a$, through the upper end of which by means of the top 20 the chocolate escapes or is discharged into the reticulated or wire mesh trough 9.

In order to permit the ready removal of shaft $9^a$, when so desired, and at the same time prevent said shaft from falling out when the case of the emulsifier is opened, there is provided at one end of the case a spring pressed arm 23 which normally rests against the shaft as shown in dotted lines in Fig. 3, and in full in Fig. 6.

24 indicates a plate designed to direct any overflow from the hopper or chute 19 back to the main receptacle.

25 indicates a bracket secured to one of the said frames of the machine, the purpose of which is to support one end of the emulsifier the opposite end of said emulsifier being supported from the aforesaid plate 24 itself supported by the rod or bar 26 running transversely of the line of the emulsifier.

Obviously the application of the invention is not limited to the particular type of machine illustrated but may also be employed in conjunction with other coating machines of the "Enrober" type. Further the mixing or emulsifying apparatus may be of any other form and construction to that described and illustrated.

Claims.

1. In a core coating machine, the combination of, a reservoir for the coating material; means for emulsifying the coating material; means for conveying the coating material from said reservoir to the emulsifying means; a trough for distributing the emulsified material upon the cores; means cooperating between the emulsifying means and said trough for conveying the emulsified material from said means to the trough; and means for conveying the cores for distribution of the emulsified material thereupon from said trough.

2. In a core coating machine, the combination of, a reservoir for the coating material; means for emulsifying the coating material; means for conveying the coating material from said reservoir to the emulsifying means; a stationary trough for distributing the emulsified material upon the cores; means cooperating between the emulsifying means and said trough for conveying the emulsified material from said means to the trough; and means for conveying the cores for distribution of the emulsified material thereupon from said trough.

3. In a core coating machine, the combination of, a reservoir for the coating material; means for emulsifying the coating material; means for conveying the coating material from said reservoir to the emulsifying means; a trough adapted for distributing the emulsified material in continuous streams upon the cores; means cooperating between the emulsifying means and said trough for conveying the emulsified material from said means to the trough; and means for conveying the cores for distribution of the emulsified material thereupon from said trough.

4. In a core coating machine, the combination of, a reservoir for the coating material; means for emulsifying the coating material; means for conveying the coating material from said reservoir to the emulsifying means; a trough of wire mesh for distributing the emulsified material upon the cores;

means cooperating between the emulsifying means and said trough for conveying the emulsified material from said means to the trough; and means for conveying the cores for distribution of the emulsified material thereupon from said trough.

5. In a core coating machine, the combination of, a reservoir for the coating material; means for emulsifying the coating material; means for conveying the coating material from said reservoir to the emulsifying means; a stationary trough of wire mesh for distributing the emulsified material upon the cores; means cooperating between the emulsifying means and said trough for conveying the emulsified material from said means to the trough; and means for conveying the cores for distribution of the emulsified material thereupon from said trough.

6. In a core coating machine, the combination of, a reservoir for the coating material; means for emulsifying the coating material; means for conveying the coating material from said reservoir to the emulsifying means; a trough for distributing the emulsified material upon the cores; means cooperating between the emulsifying means and said trough for conveying the emulsified material from said means to the trough and discharging the same by gravity into the trough; and means for conveying the cores for distribution of the emulsified material thereupon from said trough.

7. In a core coating machine, the combination of, a reservoir for the coating material; means for transporting the coating material by oscillatory movement and agitating the material during transportation; means for conveying the coating material from said reservoir to said transporting and agitating means; a trough for distributing the coating material upon the cores; means cooperating between said transporting and agitating means and said trough for conveying the coating material from said means to a position above said trough and discharging the same into the trough; and means for conveying the cores for distribution of the coating material thereupon from said trough.

8. In a core coating machine, the combination of, a reservoir for the coating material; means for transporting the coating material by oscillatory movement and agitating the material during transportation; means for conveying the coating material from said reservoir to said transporting and agitating means; a trough adapted for distributing the coating material in streams upon the cores; a spout cooperating between the transporting and agitating means and said trough for conveying the coating material from said means to said trough, the spout having a lip located above the trough for discharging the coating material into the trough; and means for conveying the cores for distribution of the coating material thereupon from said trough.

9. In a core coating machine, the combination of, a reservoir for the coating material, means for transporting the coating material by oscillatory movement and agitating the material during transportation; means for conveying the coating material from said reservoir to said transporting and agitating means; a trough of wire mesh for distributing the coating material upon the cores; a spout cooperating between the transporting and agitating means and said trough for conveying the coating material from said means to said trough; the spout having a lip located above the trough for discharging the coating material into the trough; and means for conveying the cores for distribution of the coating material thereupon from said trough.

In testimony whereof I have hereunto set my hand in the presence of two witnesses.

ASBJORN SONSTHAGEN.

Witnesses:
ARTHUR JOHN WRIGHT,
JAS. L. WOOD.